(12) United States Patent
Hashem et al.

(10) Patent No.: US 7,031,753 B2
(45) Date of Patent: Apr. 18, 2006

(54) DYNAMIC SUB-CARRIER ASSIGNMENT IN OFDM SYSTEMS

(75) Inventors: Bassam M. Hashem, Nepean (CA); David G. Steer, Nepean (CA); Shalini S. Periyalwar, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 206 days.

(21) Appl. No.: 10/737,772

(22) Filed: Dec. 18, 2003

(65) Prior Publication Data

US 2004/0125743 A1    Jul. 1, 2004

Related U.S. Application Data

(62) Division of application No. 09/672,704, filed on Sep. 29, 2000, now Pat. No. 6,721,569.

(51) Int. Cl.
    H04B 1/38    (2006.01)
(52) U.S. Cl. ............ 455/561; 455/452.1; 370/208
(58) Field of Classification Search .......... 455/450, 455/561, 455, 464, 403, 408, 409, 411, 415, 455/414.1, 452.1–2; 370/341, 342, 343, 370/344, 203, 208, 330
    See application file for complete search history.

(56) References Cited

U.S. PATENT DOCUMENTS

| | | | |
|---|---|---|---|
| 5,504,775 A * | 4/1996 | Chouly et al. | 370/210 |
| 6,791,962 B1 * | 9/2004 | Wentink | 370/338 |
| 6,952,454 B1 * | 10/2005 | Jalali et al. | 375/260 |
| 2002/0176485 A1 * | 11/2002 | Hudson | 375/144 |
| 2003/0012126 A1 * | 1/2003 | Sudo | 370/203 |
| 2005/0070340 A1 * | 3/2005 | Kim | 455/574 |

* cited by examiner

Primary Examiner—CongVan Tran

(57) ABSTRACT

A method and apparatus are provided for selecting and signalling the identity of sub-carriers to be used for transmission of data in a radio communication system, and for using other sub-carriers. A remote unit determines which sub-carriers are acceptable for use in data transmission by comparing the signal to interference ratio of each sub-carrier with a threshold. A sequence of numbers is generated using one set of values to identify acceptable sub-carriers and another set of values to identify unacceptable sub-carriers. The sequence of numbers is transmitted to a base station. The average signal to interference ratio of sub-carriers whose signal to interference ratio was above the threshold can also be transmitted to the base station, thereby allowing the base station to determine an optimum set of transmission parameters for use only in the acceptable sub-carriers. Alternatively, the remote unit can determine the optimum set of transmission parameters itself for transmission to the base station. As yet another alternative, the remote unit can determine an optimum Link Mode for each acceptable sub-carrier, and use a reference to the Link Modes as the set of values identifying acceptable sub-carriers. The base station transmits data over the acceptable sub-carriers at the optimum Link Mode or Link Modes. The base station may use some of the unacceptable sub-carriers for transmission of low sensitivity data at the optimum Link Mode, and may use some of the unacceptable sub-carriers for transmission of data at a lower Link Mode. The transmission power of any unused unacceptable sub-carriers can be diverted to other sub-carriers.

20 Claims, 6 Drawing Sheets

DYNAMIC SUB-CARRIER ASSIGNMENT IN OFDM SYSTEMS

CROSS-REFERENCE TO RELATED APPLICATION

This application is a divisional of application Ser. No. 09/672,704 filed Sep. 29, 2000 now U.S. Pat. No. 6,721,569.

FIELD OF THE INVENTION

This invention relates to digital radio communication systems employing multiple sub-carriers, and more particularly to dynamic use of sub-carriers within such systems.

BACKGROUND OF THE INVENTION

In a digital radio communication system a base station transmits a signal at a transmission rate to a remote unit through a radio channel having channel characteristics, such as an attenuation. The signal is transmitted using transmission parameters, such as a modulation level and a coding rate. The transmission rate depends on the transmission parameters. The transmission parameters are constrained by an acceptable bit error rate and by a signal to interference ratio of the signal, the latter varying in time with the channel characteristics. The communication system can use adaptive modulation to adjust the transmission parameters to accommodate changes in channel characteristics over time. If a change in channel characteristics results in a lower signal to interference ratio, the modulation level must be reduced (for example, from 16-QAM to QPSK) or the coding rate must be improved (for example, from ¾ to ⅔) in order to maintain the acceptable bit error rate, albeit at a lower transmission rate. If a change in channel characteristics results in a higher signal to interference ratio, the base station can increase the modulation level or decrease the coding rate in order to obtain a higher transmission rate.

In a communication system that implements adaptive modulation, the base station and the remote unit must be synchronized with respect to the transmission parameters. In current communication systems the remote unit determines a channel quality when the remote unit receives a frame of data. The remote unit may estimate, for example, the signal to interference ratio of the channel. The remote unit sends a signal back to the base station reporting the channel quality. Using the channel quality report received from the remote unit, the base station calculates a set of optimum transmission parameters which the base station will use in its next transmission of data. However, the base station must first send the set of new optimum transmission parameters to the remote unit using the previous transmission parameters. The remote unit receives the set of new optimum transmission parameters, interpreting the signal using the previous transmission parameters. The remote unit then decodes subsequent frames of data using the new optimum transmission parameters.

In communication systems that make use of multiple antennae for transmission and reception, the transmission parameters may include adaptive antenna and coding parameters. For example, some "smart antenna" systems may adaptively adjust their directional patterns towards the remote units. An outline of such systems may be found in the paper by J. H. Winters, "Smart Antennas for Wireless Systems", IEEE Pers. Commun., vol. 5, no. 1, February 1998, pp. 23–27, which is incorporated by reference herein. Similarly, the radio system may make use of the multiple communication channels that exist between transmitters and receivers with multiple antennae. In this case, the transmission parameters include both space (across multiple antennae) and time (different time of transmission) aspects that adapt the transmissions to the multiple propagation environment. An outline of such systems may be found in the paper by A. J. Paulraj and B. C. Ng, "Space-time Modems for Wireless Personal Communications", IEEE Pers. Commun., vol. 5, no. 1, February 1998, pp. 36–48, which is incorporated by reference herein.

In communication systems employing many sub-carriers, such as those that employ Orthogonal Frequency Division Multiplexing (OFDM systems), the channel quality may vary with the frequency of each sub-carrier. OFDM systems can use 1000 sub-carriers, and transmission of information describing the channel quality and a set of optimum transmission parameters for each sub-carrier would require significant overhead, reducing the efficiency of the communication system. In current methods, the signal to interference ratio is averaged over all sub-carriers so that only one signal to interference ratio is reported to the base station and only one set of new optimum transmission parameters is transmitted to the remote unit. In this method, the single set of new optimum transmission parameters results in an unnecessarily low transmission rate for individual sub-carriers whose signal to interference ratio is higher than the average signal to interference ratio reported by the receiver.

SUMMARY OF THE INVENTION

The present invention provides a method of selecting and signalling the identity of acceptable groups of sub-carriers in a radio communication system. A remote unit receives a signal as more than one sub-carrier signal from a base station. The remote unit determines a channel quality (such as a signal to interference ratio or a reciprocal of an error rate) of each group of sub-carrier signals, and compares the channel quality of each group of sub-carrier signals with a threshold. A sequence of numbers is generated, there being one number for each group of sub-carrier signals. Each number has a value belonging to a first set of values if the channel quality of the corresponding group of sub-carriers is above the threshold, and has a value belonging to a second set of values if the channel quality of the corresponding group of sub-carriers is not above the threshold, the two sets of values having no values in common. The first set of values may consist of the value one and the second set of values may consist of the value zero, in which case each number in the sequence has a length of one bit. The remote unit generates at least one value by which the base station can determine one or more Link Modes, a Link Mode being a set of transmission parameters. The remote unit transmits the sequence of numbers and the values by which the base station can determine the Link. Mode or Link Modes.

The remote unit may calculate the average channel quality of groups of sub-carriers whose channel quality is above the threshold, in which case the average channel quality is transmitted to the base station. The remote unit may also determine a Link Mode using the average channel quality, in which case the Link Mode is transmitted to the base station. The remote unit may alternatively determine a Link Mode for each group of sub-carriers whose channel quality is above the threshold, in which case the sequence of numbers and the values by which the base station can determine the Link Mode of each sub-carrier whose channel quality is above the threshold is transmitted. In the latter case, the sequence of numbers and the values by which the base station can determine the Link Modes can be combined into a single sequence of numbers.

The present invention also provides a method of assigning transmission tasks to at least one sub-carrier in a radio communication system. A base station receives a return signal, and extracts from the return signal a sequence of numbers, each number corresponding to one group of sub-carriers, and at least one value by which the base station can determine at least one Link Mode. The base station determines at least one Link Mode based on the at least one value. The base station defines a set of acceptable groups of sub-carriers as all groups of sub-carriers for which the corresponding number has a value belonging to a first set of values, and defines a set of unacceptable groups of sub-carriers as all groups of sub-carriers for which the corresponding number has a value belonging to a second set of values, the two sets of values having no values in common. The base station allocates for data transmission at one of the Link Modes the sub-carriers which belong to the groups of sub-carriers within the set of acceptable groups of sub-carriers. In one embodiment, the return signal includes an average channel quality and the base station determines a single Link Mode based on the average channel quality. In another embodiment, the return signal includes a reference to a Link Mode and the base station determines a single Link Mode based on the reference to the Link Mode. In yet another embodiment, the return signal includes references to one Link Mode for each acceptable group of sub-carriers, possibly within the sequence of numbers, and the base station determines a Link Mode for each acceptable group of sub-carriers based on the corresponding reference. The base station may allocate for low sensitivity data transmission sub-carriers within some of the unacceptable sub-carriers, may allocate for data transmission at a low transmission rate sub-carriers within some of the remaining unacceptable sub-carriers, and may divert transmission power from the remaining unused unacceptable sub-carriers to other sub-carriers.

The method provides improved efficiency of a communication system by allowing sub-carriers having a high signal to interference ratio to use a higher transmission rate. Sub-carriers having a low signal to interference ratio can be used for less sensitive traffic, or their transmission power can be diverted to sub-carriers having a high signal to interference ratio.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
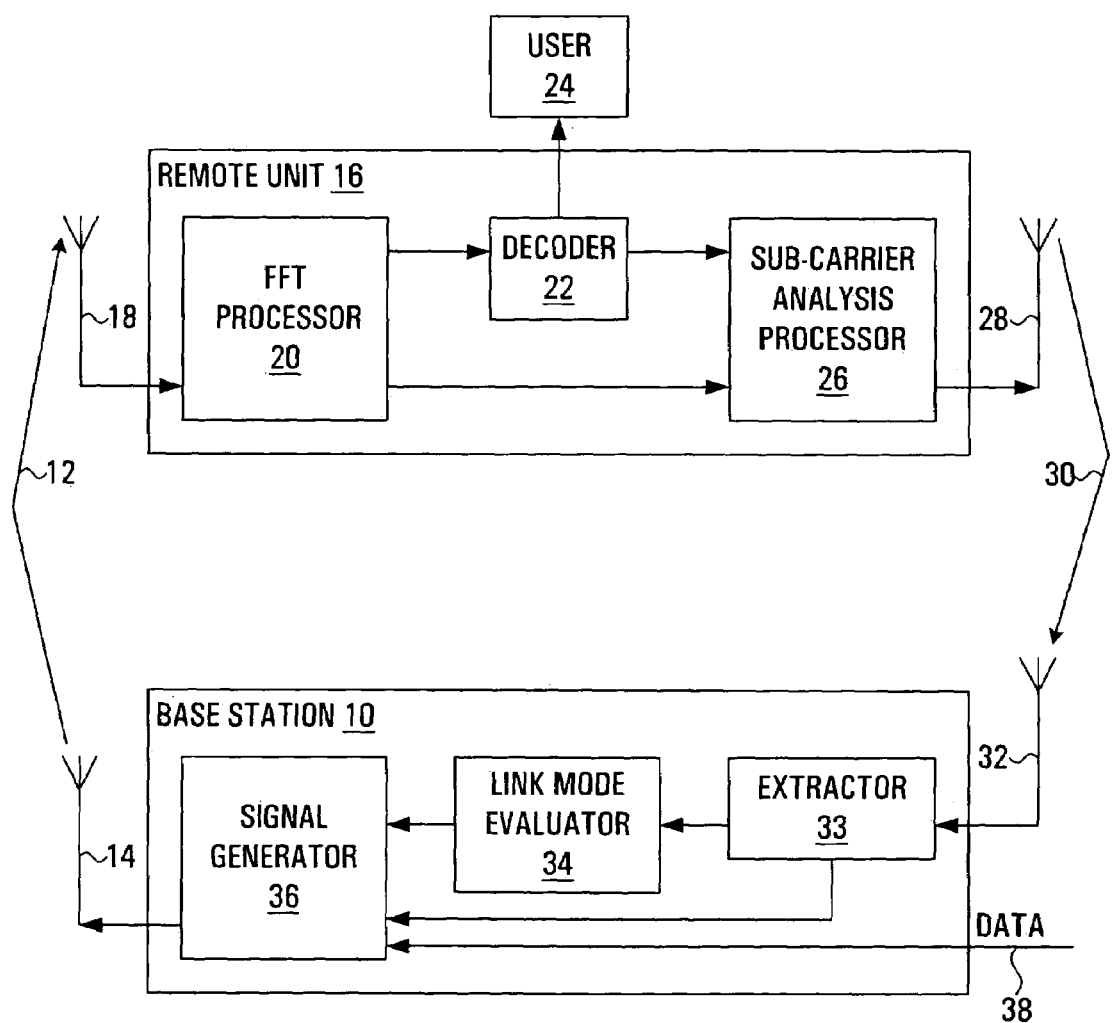
FIG. 1 is a block diagram of a portion of a radio communication system in which the invention is implemented.

Referring to FIG. 1, a portion of a radio communication system is shown. The radio communication system employs a plurality of sub-carriers to transmit traffic from a base station 10 to a remote unit 16. For example, the radio communication system may employ Orthogonal Frequency Division Multiplexing. A signal generator 36 within the base station 10 generates a signal 12. The signal is transmitted through a base station transmitting antenna 14. Each sub-carrier carries data encoded with a Link Mode. A Link Mode is a set of at least one transmission parameter, such as a modulation level, a coding rate, a symbol rate, a transmission power level, antenna directional parameters, or space-time coding parameters. The signal 12 propagates along a forward link to the remote unit 16, where it is received at a remote unit receiving antenna 18 as a received signal. A Fast Fourier Transform (FFT) processor 20 within the remote unit 16 separates the received signal into a plurality of sub-carrier signals, there being one sub-carrier signal for each sub-carrier. A decoder 22 within the remote unit decodes the sub-carrier signals to produce received data. Each sub-carrier signal is decoded using a Link Mode appropriate to the sub-carrier of the sub-carrier signal. The decoded data is then passed to a user 24.

Figure 2:
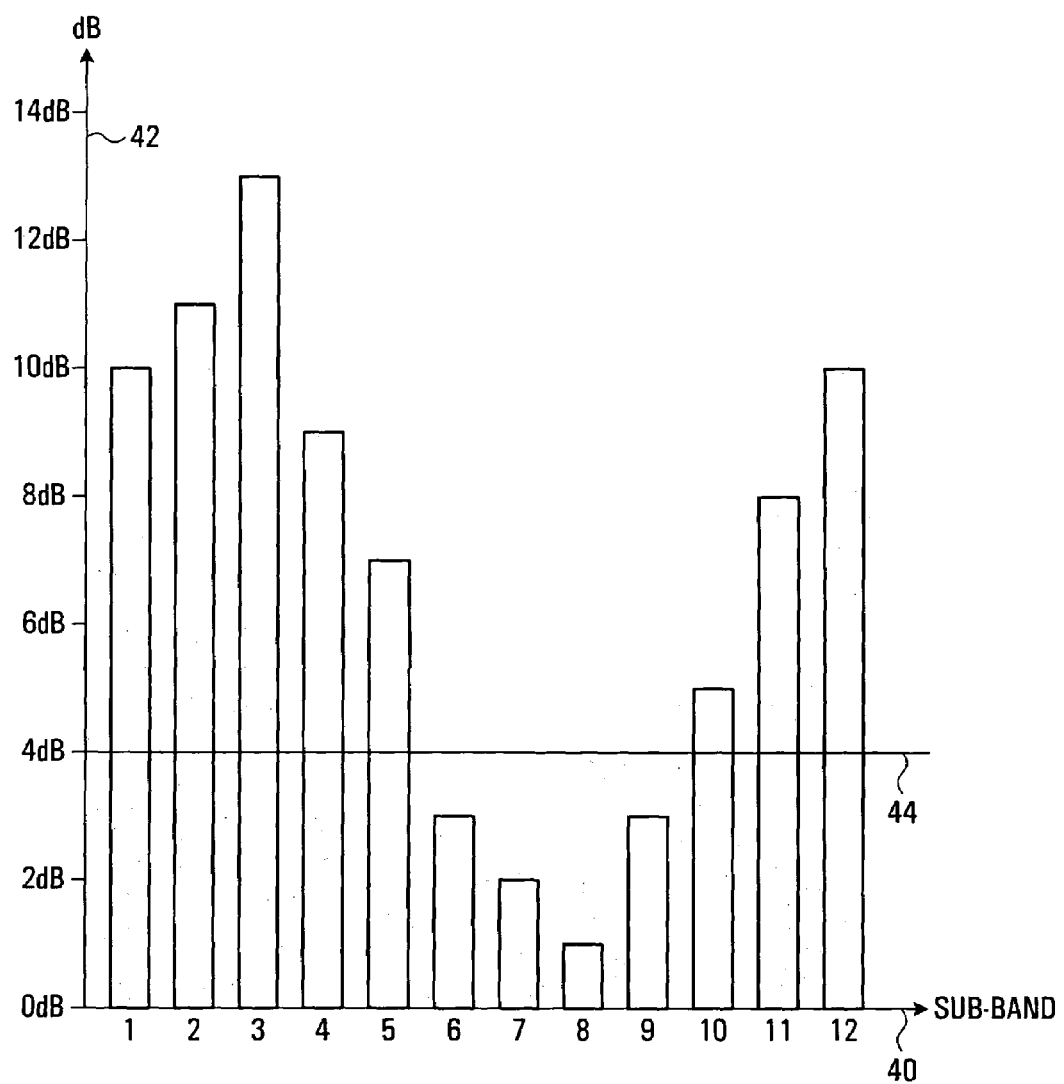
FIG. 2 is a chart of example signal to interference ratios in several sub-carriers.

The sub-carrier signals are also passed to a sub-carrier analysis processor 26 within the remote unit. The sub-carrier analysis processor 26 measures a signal to interference ratio (S/I) of each sub-carrier signal. The sub-carrier analysis processor 26 compares the S/I of each sub-carrier signal with a threshold to determine which sub-carriers are acceptable sub-carriers. Acceptable sub-carriers are sub-carriers for which the measured S/I of the corresponding sub-carrier signal is higher than the threshold. Sub-carriers for which the measured S/I of the corresponding sub-carrier signal is not higher than the threshold are unacceptable sub-carriers. The sub-carrier analysis processor 26 calculates an average S/I of the S/Is of the acceptable sub-carriers. Referring to FIG. 2, an example set of S/Is is shown. A horizontal axis 40 indicates a sub-band number of each of twelve sub-carriers. A vertical axis 42 indicates the S/I in dB of the sub-carrier signals. If a threshold 44 having a value of 4 dB is used, then the sub-carrier analysis processor 26 will identify eight of the sub-carriers (sub-band numbers 1, 2, 3, 4, 5, 10, 11, and 12) as being acceptable sub-carriers. The sub-carrier analysis processor 26 calculates the average S/I of the acceptable sub-carriers in FIG. 2 as having a value of 9.1 dB, whereas the average S/I of all sub-carriers in FIG. 2 would be 6.8 dB.

Returning to FIG. 1, the remote unit 16 transmits a return signal 30 along a reverse link to the base station 10 through a remote unit transmitting antenna 28, which may or may not be the same antenna as the remote unit receiving antenna 18. The return signal 30 includes the average S/I of acceptable sub-carriers and a sequence of numbers identifying the acceptable sub-carriers. If a value of "1" is used to identify acceptable sub-carriers and a value of "0" is used to identify unacceptable sub-carriers, or the reverse, then the sequence of numbers can be a bitmask, using one bit to indicate the acceptability of each sub-carrier. Of course other values can be used to indicate which sub-carriers are acceptable and which sub-carriers are unacceptable, but then more bits are required in the sequence of numbers for each sub-carrier. In the example of FIG. 2, the remote unit 16 would transmit an average S/I having a value of 9.1 dB and a bitmask having a value of "111110000111".

The return signal 30 is received by the base station 10 at a base station receiving antenna 32, which may or may not be the same antenna as the base station transmitting antenna 14. An extractor 33 within the base station extracts the average S/I from the return signal 30 and passes it to a Link Mode evaluator 34 within the base station. The extractor 33 also extracts the bitmask from the return signal 30 and passes it to the signal generator 36. The extractor 33 is a processor. The Link Mode evaluator 34 selects an optimum Link Mode based on the average S/I received from the remote unit 16 and on requirements of the communication system, such as an acceptable bit error rate. The Link Mode evaluator 34 is a processor, and may be combined with the extractor 33. The optimum Link Mode is passed to the signal generator 36 within the base station, along with the bitmask from the extractor 33 and along with data 38 which is to be transmitted.

The signal generator 36 encodes the data 38 using the optimum Link Mode, and generates a new signal. The signal generator 36 differentiates the sub-carriers into a set of acceptable sub-carriers and a set of unacceptable sub-carriers. The new signal only codes the data 38 over the acceptable sub-carriers. Whether a particular sub-carrier is acceptable or unacceptable is determined from the bitmask, or more generally from the sequence of numbers, most recently received from the remote unit 16. Each unacceptable sub-carrier can be allocated for one of several uses. Zero or more of the unacceptable sub-carriers are used to transmit low sensitivity traffic encoded using the optimum Link Mode. Low sensitivity traffic can include inessential but potentially useful information, such as control bits or parity bits. Although unacceptable sub-carriers have a low S/I and may have a high bit error rate when received by the remote unit, the low sensitivity of the traffic transmitted over these sub-carriers means that some errors are tolerable. Zero or more of the remaining unacceptable sub-carriers are used to transmit low rate traffic using a second Link Mode having a lower transmission rate than the optimum Link Mode. Any remaining unacceptable sub-carriers are unused, and power that would otherwise be used to transmit information over the unused unacceptable sub-carriers is assigned to other sub-carriers.

Figure 3:
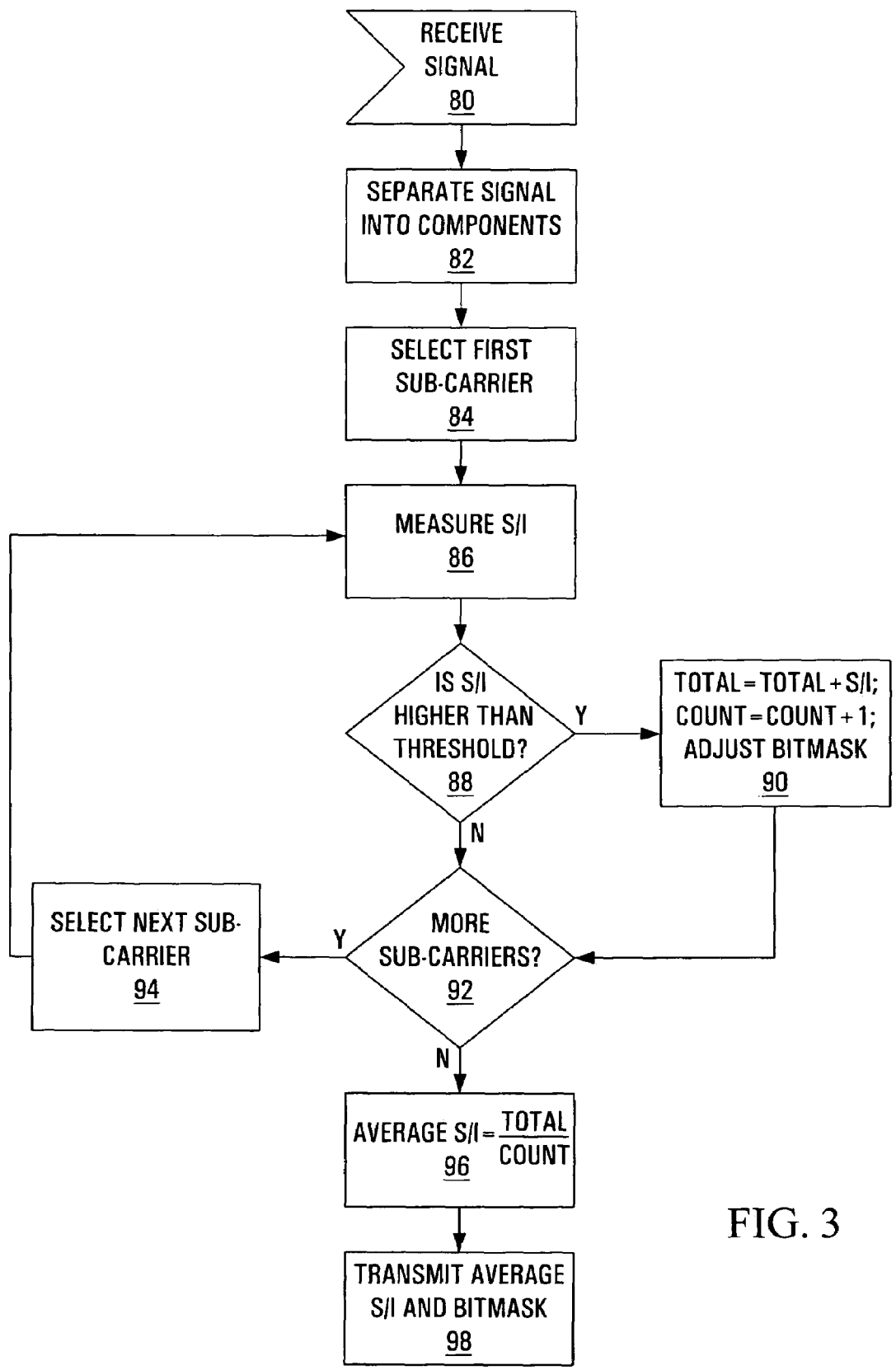
FIG. 3 is a flow chart of a method by which a remote unit determines and conveys information concerning acceptable sub-carriers to a base station.

Referring to FIG. 3, a method by which the remote unit 16 determines the acceptable sub-carriers and the average S/I is shown. The remote unit receives a signal at step 80 at the remote unit receiving antenna 18. At step 82 the signal is separated into its sub-carrier signals by the FFT processor 20. The first sub-carrier is selected at step 84. At step 86 the S/I of the sub-carrier signal of the selected sub-carrier is measured. If at step 88 the measured S/I is higher than a threshold, then the selected sub-carrier is an acceptable sub-carrier. At step 90 a running total is increased by the measured S/I, a count of acceptable sub-carriers is increased by one, and the sequence of numbers, preferably a bitmask, is adjusted to identify the selected sub-carrier as being an acceptable sub-carrier. If at step 92 there are further sub-carriers, then at step 94 the next sub-carrier is selected and the algorithm returns to step 86 to measure the S/I of sub-carrier signal of the next sub-carrier. If at step 92 there are no further sub-carriers, then at step 96 the average S/I of acceptable sub-carriers is calculated as the running total divided by the count of acceptable sub-carriers. Steps 82 to 96 are carried out by the sub-carrier analysis processor 26. At step 98 the average S/I and the sequence of numbers are transmitted to the base station through the remote unit transmitting antenna 28. Steps 84, 92, and 94 form a loop that cycles through each sub-carrier, although any method of measuring the S/I of each sub-carrier signal could be used. Steps 90 and 96 calculate the average S/I, although any method of calculating the average S/I could be used. For example, the count of the acceptable sub-carriers could be determined at step 96 from the sequence of numbers.

Figure 4:
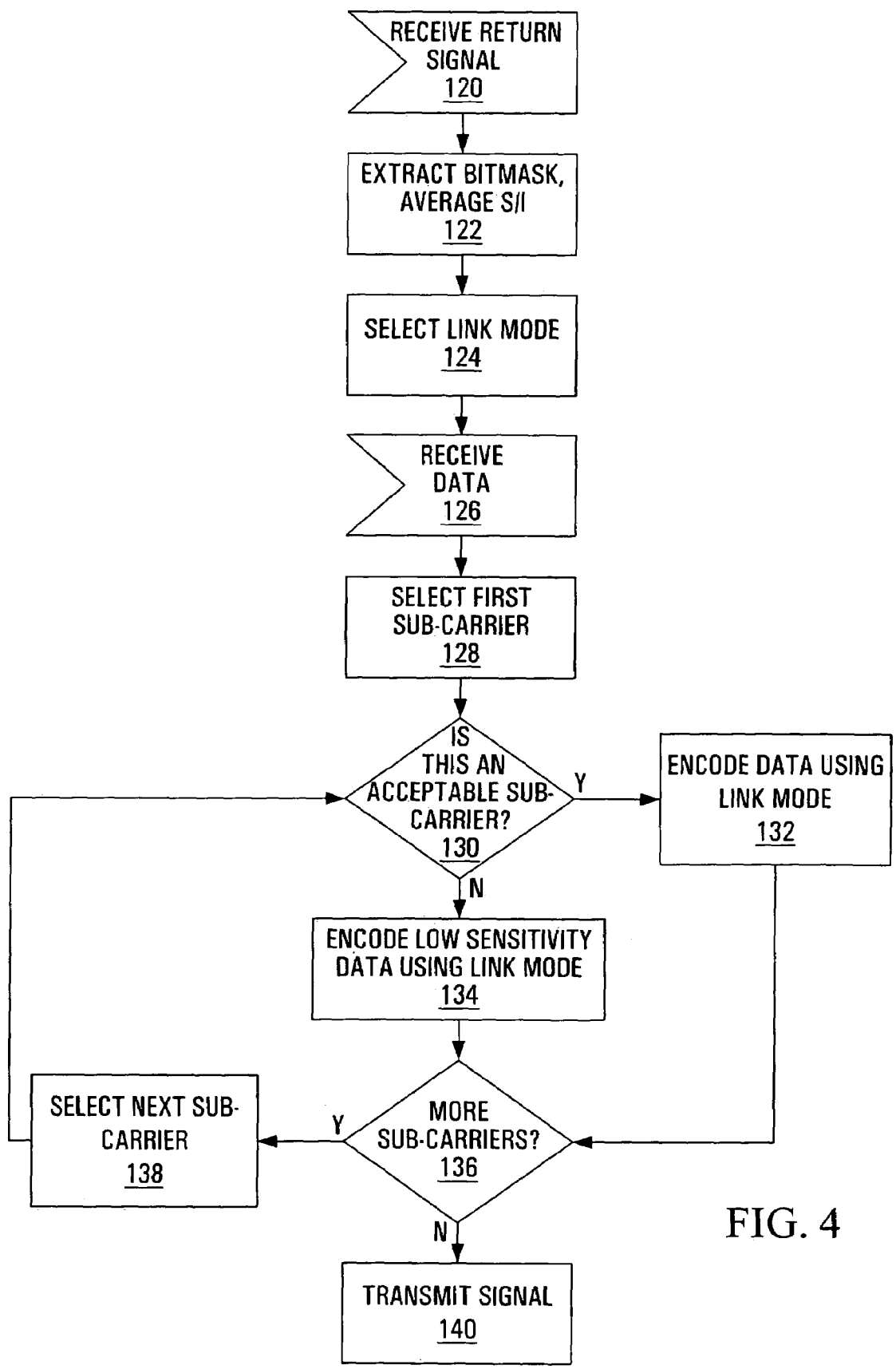
FIG. 4 is a flow chart of a method by which a base station makes use of information concerning acceptable sub-carriers.

Referring to FIG. 4, a method by which the base station uses the sub-carriers is shown. At step 120 the base station receives a return signal at the base station receiving antenna 32. At step 122 the sequence of numbers, preferably a bitmask, and the average S/I are extracted from the return signal by the extractor 33. At step 124 the Link Mode evaluator 34 selects an optimum Link Mode based on the average S/I. At step 126 the base station receives data to be transmitted. The first sub-carrier is selected at step 128. At step 130 the base station determines whether the selected sub-carrier is an acceptable sub-carrier by comparing the sub-band number of the sub-carrier with the sequence of numbers. For example, if the sequence of numbers is a bitmask with a value of "111110001111" and the selected sub-carrier was the first sub-carrier, then a comparison of the sub-band number and the bitmask would produce a value of "1" since that is the value of the first bit, and the selected sub-carrier would therefore be an acceptable sub-carrier. If the selected sub-carrier was the sixth sub-carrier, then a comparison of the sub-band number and the bitmask would produce a value of "0" since that is the value of the sixth bit, and the selected sub-carrier would therefore be an unacceptable sub-carrier. If at step 130 the base station determines that the selected sub-carrier is an acceptable sub-carrier, then at step 132 the data is encoded for transmission over the selected sub-carrier using the optimum Link Mode. If at step 130 the base station determines that the selected sub-carrier is an unacceptable sub-carrier, then at step 134 low sensitivity data is encoded for transmission over the selected sub-carrier using the optimum Link Mode. Alternatively, at step 134 regular data could be encoded for transmission over the selected sub-carrier at a second Link Mode having a lower transmission rate than the optimum Link Mode, or no data could be encoded for transmission over the selected sub-carrier and the transmission power of the selected sub-carrier diverted to other sub-carriers. If at step 136 there are further sub-carriers, then at step 138 the next sub-carrier is selected and the algorithm returns to step 130 to determine whether the next sub-carrier is an acceptable sub-carrier. If at step 136 there are no further sub-carriers, then at step 140 the signal is transmitted to the receiver. Steps 128 to 138 are carried out by the signal generator 36. Steps 128, 136, and 138 form a loop that cycles through each sub-carrier, although any method of determining which sub-carriers are acceptable sub-carriers could be used.

Signalling overhead can be reduced in a number of ways. Overhead on the forward link from the base station to the remote unit can be reduced if the remote unit calculates the optimum Link Mode itself, using an algorithm similar to that used by the Link Mode evaluator 34. After a delay sufficient to allow the return signal 30 to reach the base station and to allow the signal 12 carrying a frame encoded using the optimum Link Mode to reach the remote unit, the decoder 22 decodes frames using the optimum Link Mode. The base station need not transmit the optimum Link Mode to the remote unit. If the frames include numbered packets, then synchronization of the optimum Link Mode can be achieved more precisely if the remote unit includes a packet number in the return signal rather than estimating the delay. The base station begins using the optimum Link Mode when it transmits a packet having the packet number identified in the return signal, and the remote unit begins using the optimum Link Mode when it receives a packet having the packet number identified in the return signal.

Overhead on the reverse link can be reduced if the remote unit calculates the optimum Link Mode itself and transmits a reference to the optimum Link Mode to the base station, as disclosed in a U.S. patent application entitled "Receiver based adaptive modulation scheme" by Hashem et al., filed on Sep. 27, 2000, and assigned to the assignee of the present application, and incorporated by reference herein. The return signal can be viewed more generally as including a sequence of numbers identifying acceptable sub-carriers, and a value by which the base station can determine an optimum Link Mode. The value by which the base station can determine an optimum Link Mode may be the average S/I, as described above. Alternatively, if the remote unit determines the optimum Link Mode itself, then the value may be a reference to the optimum Link Mode. If the optimum Link Mode is one of a set of allowed Link Modes agreed upon by the base station and the remote unit prior to a transmission, the reference may be an index to the optimum Link Mode within the set of allowed Link Modes. The return signal 30 contains the sequence of numbers and the reference, but not the average S/I of acceptable sub-carriers. The extractor 33 simply extracts the reference to the optimum Link Mode from the return signal 30 at step 122, and the Link Mode evaluator 34 determines the optimum Link Mode at step 124 from the set of allowed Link Modes using the reference.

Figure 5:
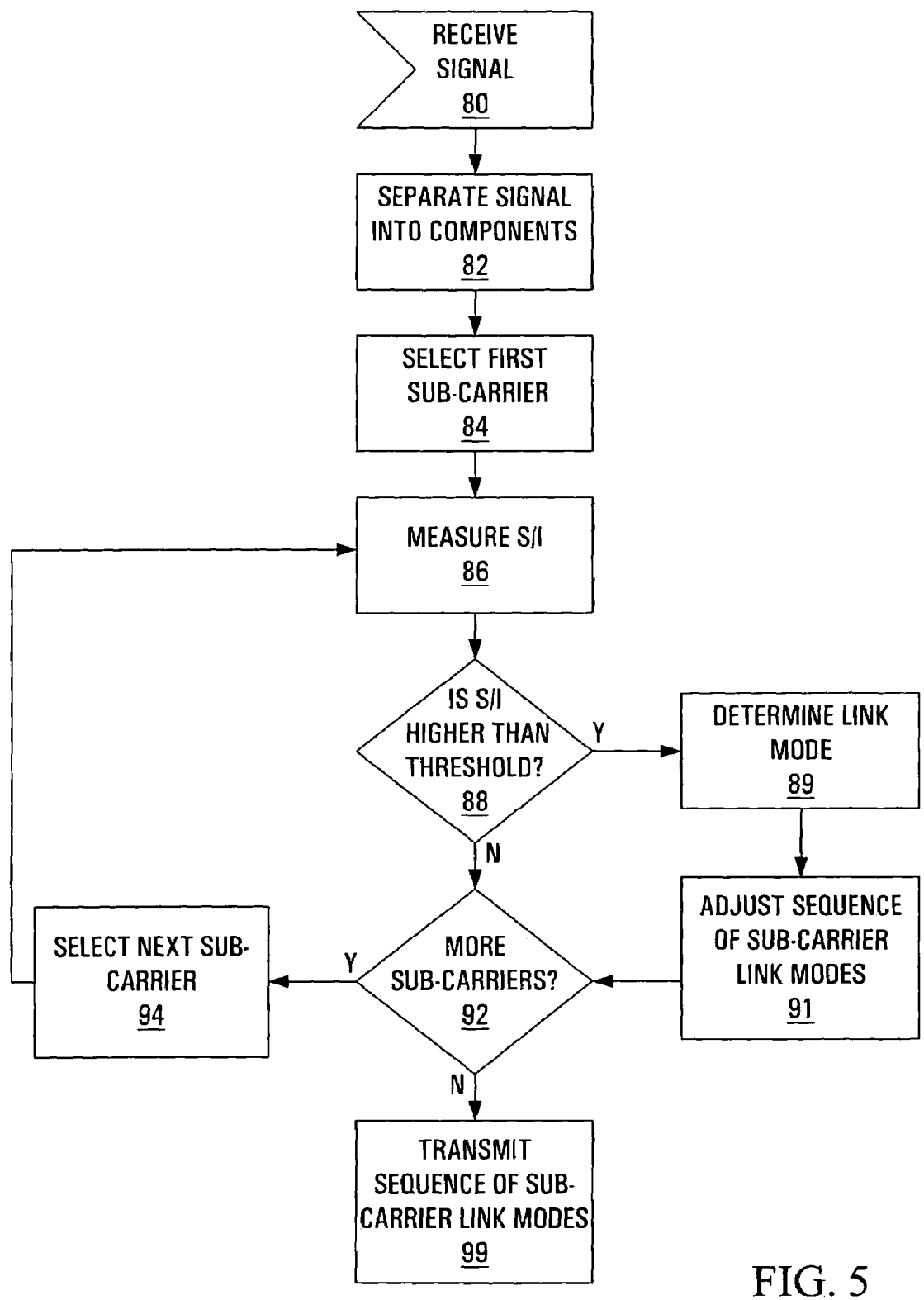
FIG. 5 is a flow chart of an alternative method by which a remote unit determines and conveys information concerning acceptable sub-carriers to a base station.

A different Link Mode can be used for each acceptable. sub-carrier if the Link Modes are calculated by the remote unit and transmitted to the base station. In this embodiment, the remote unit transmits more than one value by which the base station can determine more than one Link Mode, preferably as a sequence of references to sub-carrier Link Modes. The sequence of numbers identifying the acceptable sub-carriers and the values by which the base station can determine the Link Modes can be sent along the return channel separately, or can be combined by forming the sequence of numbers from the sub-carrier Link Mode of each acceptable sub-carrier and one or more distinct values identifying unacceptable sub-carriers. If in the example of FIG. 2 a S/I of 10 dB or higher (for example) allows use of a seventh Link Mode within the set of allowed Link Modes, a S/I of 7 dB or higher allows use of a sixth Link Mode within the set of allowed Link Modes, and a S/I of 4 dB or higher allows use of a fifth Link Mode within the set of allowed Link Modes (a higher ordinal rank of Link Mode having a higher transmission rate), then the remote unit transmits a sequence of numbers having a value of "777660000567" to the base station along the reverse link. A number having a value of "0" indicates that the corresponding sub-carrier is unacceptable, and a number having a value other than zero indicates both that the corresponding sub-carrier is acceptable and the Link Mode to be used when encoding data for transmission over that sub-carrier. The method carried out by the remote unit is shown in FIG. 5. The method shown in FIG. 5 is similar to the method shown in FIG. 3, except that the average S/I is not calculated (eliminating steps 90 and 96), a sub-carrier Link Mode is evaluated for each sub-carrier (adding steps 89 and 91), and the average S/I is not included in the return signal (replacing step 98 with step 99). At step 89 a Link Mode evaluator (not shown in FIG. 1, and which may or may not be a component of the sub-carrier analysis processor) in the remote unit determines the Link Mode for the selected sub-carrier based on the S/I of the selected sub-carrier measured at step 86, as disclosed in patent application entitled "Receiver based adaptive modulation scheme". At step 91 the sequence of references to sub-carrier Link Modes is adjusted by setting the corresponding number in the sequence of numbers to be a reference to the Link Mode determined at step 89.

Figure 6:
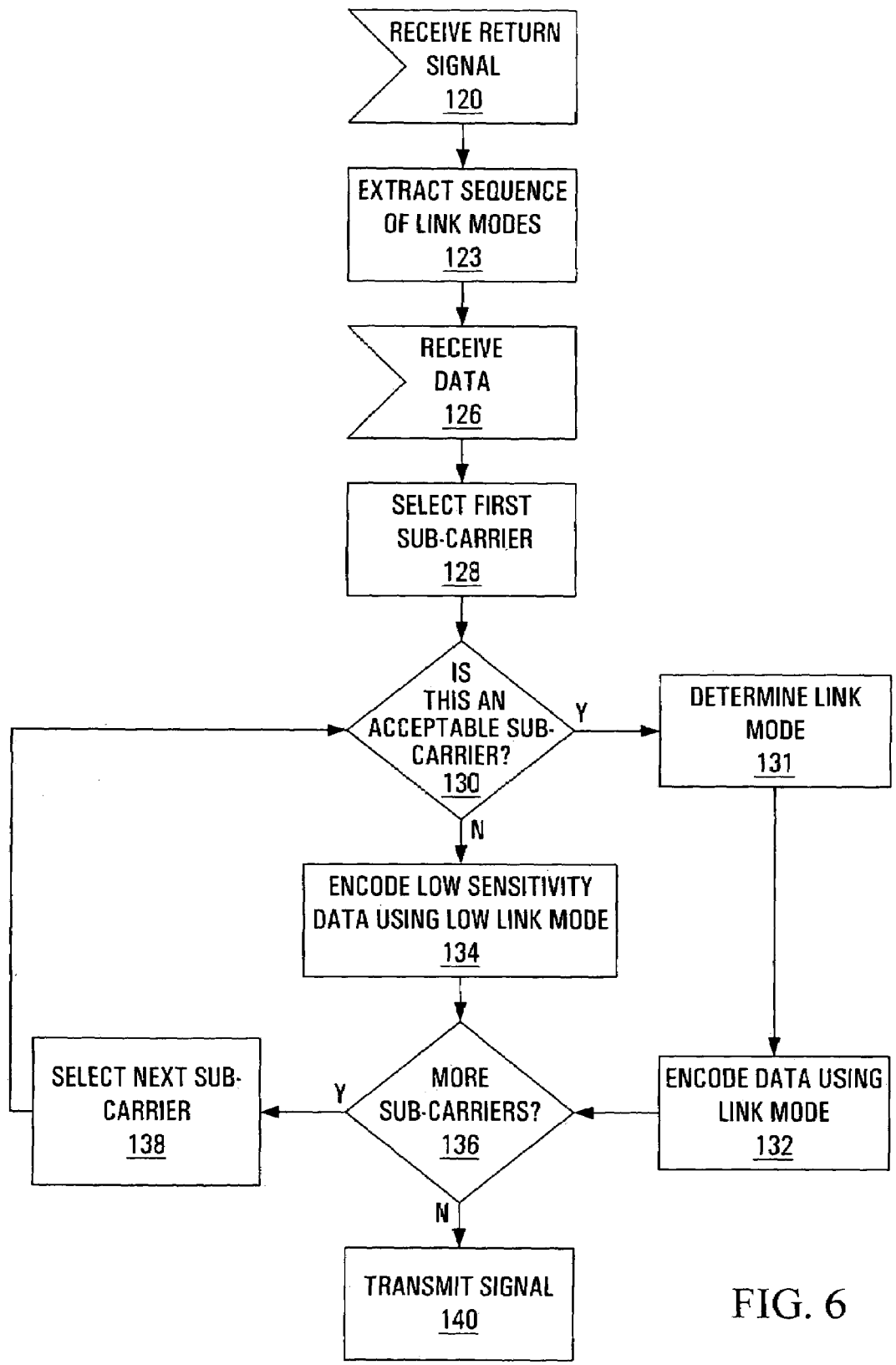
FIG. 6 is a flow chart of an alternative method by which a base station makes use of information concerning acceptable sub-carriers.

The method carried out by the base station in the embodiment in which the Link Mode of each acceptable sub-carrier is transmitted to the base station is shown in FIG. 6. The method shown in FIG. 6 is similar to the method shown in FIG. 4, except that the average S/I is not included in the return signal (replacing step 122 with step 123), and the step of selecting the Link Mode (formerly step 124) is now contained within the loop that cycles through the sub-carriers, at step 131. Unacceptable sub-carriers are identified at step 130 by numbers having a value of "0" within the sequence of numbers. Acceptable sub-carriers are identified at step 130 by numbers having a value other than "0", and the signal generator 36 polls the Link Mode evaluator 34 for the Link Mode of such sub-carriers by passing the value of the number to the Link Mode evaluator 34. As there is no single Link Mode, low sensitivity data can be encoded over unacceptable sub-carriers at step 134 using a Link Mode having a low transmission rate, or the transmission power from the unacceptable sub-carriers can be diverted to other sub-carriers.

Overhead can be further reduced if the sub-carriers are grouped into groups of sub-carriers by the components of the remote unit and the base station. Sub-carriers having carrier frequencies close to each other will usually have similar channel qualities, so determining whether an entire group of sub-carriers is an acceptable group or an unacceptable group will offer a good approximation to correctly defining the individual sub-carriers as acceptable or unacceptable. Overhead is saved because fewer numbers are needed in the sequence of numbers defining acceptable and unacceptable sub-carriers. The base station assigns the same transmission task for every sub-carrier within a group of sub-carriers, as the sequence of numbers identifying acceptable groups of sub-carriers contains one number for each group of sub-carriers. Furthermore, in the embodiment in which the remote unit calculates more than one Link Mode, the remote unit can calculate a group Link Mode for each acceptable group of sub-carriers. In general, there will be fewer group Link Modes to calculate and transmit to the base station than there would be individual sub-carrier Link Modes. The base station uses the same group Link Mode for every sub-carrier within an acceptable group of sub-carriers. Of course each group of sub-carriers may contain only one sub-carrier, as in the various embodiments described above.

The various embodiments have been described using a S/I as a measure of channel quality. Other measures of channel quality could be used and an average channel quality reported to the base station, as long as the channel quality is such that an optimum Link Mode can be determined. For example, the sub-carrier analysis processor may assess the channel quality of each sub-carrier by observing an error rate of the received data. The sub-carrier analysis processor 26 may determine the error rate from the decoder 22 from the error correcting codes. An error rate threshold can be set (similarly to the S/I threshold discussed above). Acceptable sub-carriers would be those sub-carriers with an error rate lower than the threshold (that is, with fewer errors), and unacceptable sub-carriers would be those sub-carriers with an error rate higher than the threshold (that is, with more errors). The sub-carrier analysis processor 26 would then calculate the average error rate of the acceptable sub-carriers, which would then be transmitted to the base station in the same manner as the average signal to interference ratio, as described above. A logical equivalent to the relationships between the error rate and the threshold is achieved if the sub-carrier analysis processor compares the reciprocal of the error rate with a threshold. In such a case, acceptable sub-carriers are those for which the reciprocal of the error rate is above the threshold and unacceptable sub-carriers are those for which the reciprocal of the error rate is below the threshold. This has the advantage of preserving the conditional relationship between the channel quality and the threshold which is used when the channel quality is a signal to interference ratio. In either case, the average error rate of acceptable sub-carriers or the average of the reciprocals of the error rates of acceptable sub-carriers can be transmitted to the base station for use by the base station in determining an optimum Link Mode.

Although the invention has been developed for use with systems which employ Orthogonal Frequency Division Multiplexing, it is possible that the invention could be used with other systems which employ multiple sub-carriers simultaneously, and the invention is therefore considered not to be limited to OFDM systems.

What has been described is merely illustrative of the application of the principles of the invention. Other arrangements and methods can be implemented by those skilled in the art without departing from the spirit and scope of the present invention. Each processor described above, in particular the sub-carrier analysis processor, the extractor, and the Link Mode evaluator, may be any computing apparatus containing logic for executing the described functionality. For example, any of the processors may be a single processor, more than one processor, or a component of a larger processor. The logic may comprise external instructions or internal circuitry.

The invention claimed is:

1. A method by a base station in a radio communication system which employs Orthogonal Frequency Division Multiplexing, the radio communication system employing a plurality of sub-carriers, each sub-carrier belonging to one of a plurality of groups of sub-carriers, the base station receiving a return signal, the method comprising the steps of:
   extracting from the return signal a sequence of numbers, each number corresponding to one group of sub-carriers;
   extracting from the return signal at least one value by which the base station can determine at least one Link Mode, a Link Mode being a set of at least one transmission parameter;
   determining at least one Link Mode based on the at least one value by which the base station can determine at least one Link Mode;
   defining a set of acceptable groups of sub-carriers as all groups of sub-carriers for which the corresponding number has a value belonging to a first set of values; and
   allocating for data transmission at one of the at least one Link Mode the sub-carriers which belong to a group of sub-carriers within the set of acceptable sub-carriers.

2. The method of claim 1 comprising the further steps of:
   defining a set of unacceptable groups of sub-carriers as all groups of sub-carriers for which the corresponding number has a value belonging to a second set of values, the second set of values having no values in common with the first set of values; and
   allocating for low sensitivity data transmission sub-carriers within zero or more groups of sub-carriers within the set of unacceptable groups of sub-carriers.

3. The method of claim 1 comprising the further steps of:
   defining a set of unacceptable groups of sub-carriers as all groups of sub-carriers for which the corresponding number has a value belonging to a second set of values, the second set of values having no values in common with the first set of values; and
   allocating for data transmission at a low Link Mode sub-carriers within zero or more groups of sub-carriers within the set of unacceptable groups of sub-carriers, the low Link Mode resulting in a lower transmission rate than any of the at least one Link Mode.

4. The method of claim 1 comprising the further steps of:
   defining a set of unacceptable groups of sub-carriers as all groups of sub-carriers for which the corresponding number has a value belonging to a second set of values, the second set of values having no values in common with the first set of values; and
   allocating as unused sub-carriers within zero or more groups of sub-carriers within the set of unacceptable groups of sub-carriers.

5. The method of claim 1 wherein the at least one value by which the base station can determine at least one Link Mode is a sequence of references to group Link Modes, each reference to a group Link Mode corresponding to one group of sub-carriers belonging to the set of acceptable groups of sub-carriers, and wherein the sequence of references is included in the sequence of numbers, the first set of values thereby comprising references to group Link Modes but not including the value zero.

6. The method of claim 1 wherein the at least one value by which the base station can determine at least one Link Mode is a signal to interference ratio, and wherein the step of determining at least one Link Mode determines one Link Mode.

7. The method of claim 1 wherein the at least one value by which the base station can determine at least one Link Mode is a reference to a Link Mode, and wherein the step of determining at least one Link Mode determines one Link Mode.

8. A base station for a radio communication system which employs a plurality of sub-carriers so as to employ Orthogonal Frequency Division Multiplexing, each sub-carrier belonging to one of a plurality of groups of sub-carrier, the base station receiving a return signal from a remote unit, the base station comprising:
   means for extracting from the return signal a sequence of numbers, each number corresponding to one group of sub-carriers;
   means for extracting from the return signal at least one value by which the base station can determine at least one Link Mode, a Link Mode being a set of at least one transmission parameter;
   means for determining at least one Link Mode based on the at least one value by which the base station can determine at least one Link Mode;
   means for defining a set of acceptable groups of sub-carriers as all groups of sub-carriers for which the corresponding number has a value belonging to a first set of values; and means for allocating for data transmission at one of the at least one Link Mode the sub-carriers which belong to a group of sub-carriers within the set of acceptable groups of sub-carriers.

9. The base station of claim 8 further comprising means for defining a set of unacceptable groups of sub-carriers as all groups of sub-carriers for which the corresponding number has a value belonging to a second set of values, the second set of values having no values in common with the first set of values.

10. The base station of claim 9 further comprising means for allocating for low sensitivity data transmission sub-carriers within zero or more groups of sub-carriers within the set of unacceptable groups of sub-carriers.

11. The base station of claim 9 further comprising means for allocating for data transmission at a low Link Mode sub-carriers within zero or more groups of sub-carriers within the set of unacceptable groups of sub-carriers, the low Link Mode resulting in a lower transmission rate than any of the at least one Link Mode.

12. The base station of claim 9 further comprising means for allocating as unused sub-carriers within zero or more groups of sub-carriers within the set of unacceptable groups of sub-carriers.

13. The base station of claim 9 wherein the first set of values consists of the value one and the second set of values consists of the value zero, and each number in the sequence of numbers has a length of one bit.

14. The base station of claim 8 wherein the at least one value by which the base station can determine at least one Link Mode is a sequence of references to group Link Modes, each reference to a group Link Mode corresponding to one group of sub-carriers belonging to the set of acceptable groups of sub-carriers.

15. The base station of claim 14 wherein the sequence of references is included in the sequence of numbers, the first set of values thereby comprising references to group Link Modes, and the first set of values does not include the value zero.

16. The base station of claim 8 wherein the at least one value by which the base station can determine at least one Link Mode is a signal to interference ratio, and wherein the means for determining at least one Link Mode determine one Link Mode.

17. The base station of claim 8 wherein the at least one value by which the base station can determine at least one Link Mode is an error rate, and wherein the means for determining at least one Link Mode determine one Link Mode.

18. The base station of claim 8 wherein the at least one value by which the base station can determine at least one Link Mode is a reference to a Link Mode, and wherein the means for determining at least one Link Mode comprise means for determining one Link Mode.

19. A base station for a radio communication system which employs a plurality of sub-carriers, each sub-carrier belonging to one of a plurality of groups of sub-carriers, the base station receiving a return signal from a remote unit, the base station comprising:

means for extracting from the return signal a sequence of numbers, each number corresponding to one group of sub-carriers;

means for extracting from the return signal at least one value by which the base station can determine at least one Link Mode, a Link Mode being a set of at least one transmission parameter;

means for determining at least one Link Mode based on the at least one value by which the base station can determine at least one Link Mode;

means for defining a set of acceptable groups of sub-carriers as all groups of sub-carriers for which the corresponding number has a value belonging to a first set of values; and means for allocating for data transmission at one of the at least one Link Mode the sub-carriers which belong to a group of sub-carriers within the set of acceptable groups of sub-carriers.

20. A processor in a base station for a radio communication system which employs a plurality of sub-carriers so as to employ Orthogonal Frequency Division Multiplexing, each sub-carrier belonging to one of a plurality of groups of sub-carriers, the base station receiving a return signal from a remote unit, the processor including instructions for:

extracting from the return signal a sequence of numbers, each number corresponding to one group of sub-carriers;

extracting from the return signal at least one value by which the base station can determine at least one Link Mode, a Link Mode being a set of at least one transmission parameter;

passing the sequence of numbers to a signal generator; and passing the at least one value by which the base station can determine at least one Link Mode to a Link Mode evaluator, a Link Mode being a set of at least one transmission parameter.

* * * * *